US011905087B2

(12) United States Patent
Müller et al.

(10) Patent No.: US 11,905,087 B2
(45) Date of Patent: Feb. 20, 2024

(54) ANTI-THEFT DEVICE

(71) Applicant: rapitag GmbH, Munich (DE)

(72) Inventors: Sebastian Müller, Munich (DE); Alexander Schneider, Munich (DE)

(73) Assignee: rapitag GmbH, Munich (DE)

( * ) Notice: Subject to any disclaimer, the term of this patent is extended or adjusted under 35 U.S.C. 154(b) by 171 days.

(21) Appl. No.: 17/489,184

(22) Filed: Sep. 29, 2021

(65) Prior Publication Data

US 2023/0103200 A1 Mar. 30, 2023

(51) Int. Cl.

| | |
|---|---|
| ***B65D 55/14*** | (2006.01) |
| ***B65D 25/22*** | (2006.01) |
| ***G07C 9/00*** | (2020.01) |
| ***G08B 13/14*** | (2006.01) |
| ***E05B 65/52*** | (2006.01) |

(52) U.S. Cl.

CPC ............. *B65D 55/14* (2013.01); *B65D 25/22* (2013.01); *G07C 9/00182* (2013.01); *G08B 13/14* (2013.01); *E05B 65/52* (2013.01); *G07C 2009/0019* (2013.01)

(58) Field of Classification Search

CPC .... B65D 55/14; B65D 25/22; G07C 9/00182; G07C 2009/0019; G08B 13/14; E05B 65/52

See application file for complete search history.

(56) References Cited

U.S. PATENT DOCUMENTS

| | | | | |
|---|---|---|---|---|
| 5,507,161 | A * | 4/1996 | Broekaert | G07C 9/0069 292/201 |
| 2004/0177657 | A1 | 9/2004 | Kim | |
| 2004/0182119 | A1 | 9/2004 | Lax et al. | |
| 2010/0122986 | A1 | 5/2010 | Necchi | |
| 2017/0121068 | A1* | 5/2017 | Foshansky | E05D 11/0054 |

FOREIGN PATENT DOCUMENTS

| | | | |
|---|---|---|---|
| EP | 1285610 | A2 | 2/2003 |
| EP | 2150666 | A1 | 2/2010 |
| FR | 2733784 | A3 | 11/1996 |

OTHER PUBLICATIONS

International Application No. PCT/EP2022/077200, "International Search Report and Written Opinion", dated Jan. 10, 2023, 13 pages.

* cited by examiner

*Primary Examiner* — Kam Wan Ma
(74) *Attorney, Agent, or Firm* — Kilpatrick Townsend & Stockton LLP

(57) ABSTRACT

The invention relates to an anti-theft device comprising a housing, which is configured to be displaceably mounted to an anti-theft box, which anti-theft box is configured to receive merchandise to be protected, the housing being further configured to selectively take a releasing position, in which the anti-theft box is transferable from a closed state into an opened state, and a locking position, in which the anti-theft box is not transferable from the closed state into the opened state, a locking mechanism associated with the housing and having an unlocked state, in which the housing is displaceable from the locking position into the releasing position, and a locked state, in which the housing is not displaceable from the locking position into the releasing position.

14 Claims, 9 Drawing Sheets

ANTI-THEFT DEVICE

Figure 1:
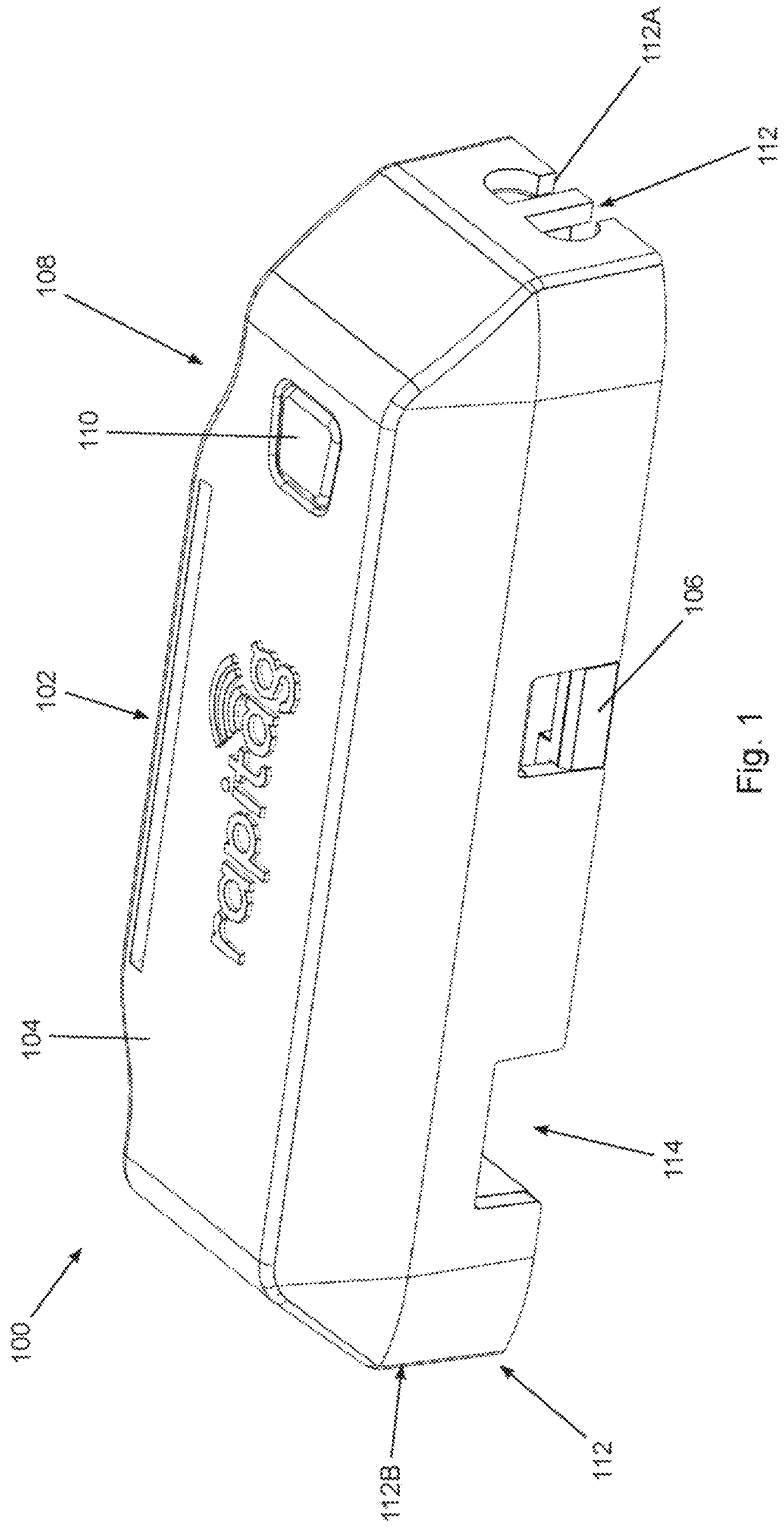

The invention relates to an anti-theft device, comprising a housing, which is configured to be displaceable mounted to an anti-theft box, which anti-theft box is configured to receive merchandise to be protected, the housing being further configured to selectively take a releasing position, in which the anti-theft box is transferable from a closed state into an opened state, and a locking position, in which the anti-theft box is not transferable from the closed state into the opened state, a locking mechanism associated with the housing and having an unlocked state, in which the housing is displaceable from the locking position into the releasing position, and a locked state, in which the housing is not displaceable from the locking position into the releasing position.

Anti-theft devices are generally well known and have been preferentially used for many years in the field of stores open to the public, as they provide sufficient protection against unauthorized removal from the store, or from or a demarcated sales area within said store, of merchandise sold therein. For this purpose, appropriate detector units are usually provided at all entrances and exits of the store, or of any demarcated sales areas therein, and these are designed and intended to emit an acoustic and/or visual warning signal if a customer attempts to remove any protected merchandise from the store or sales area without authorization, i.e., without paying for it beforehand.

Anti-theft devices of the above-mentioned type, which is configured to be displaceable mounted to an anti-theft box, are particular known to be used for securing merchandise that are frequently stolen, such as CDs, DVDs, video games, digital cameras, software, cosmetics, razors and the like. Such anti-theft boxes are often made from transparent polycarbonate material or the like and can comprise a box housing with two box housing parts, which are pivotally attached to each other. Typically, to insert merchandise to be protected in such anti-theft boxes, the two box housing parts are first pivoted to each other so as to open the anti-theft box, then merchandise is inserted in the box housing, the box housing is closed and, finally, the box housing is locked by the anti-theft device, by bringing the anti-theft device into its locking position, in which the anti-theft box is not transferable from the closed state into the opened state, and transferring the locking mechanism of the anti-theft device into its locked state. As a result, anti-theft boxes secured by anti-theft devices of the above-mentioned type provide a solution, which ensures a sufficient protection against theft of merchandise and, at the same time, does not unduly restrict the possibility of merchandise presentation.

All of the aforementioned statements also apply to the anti-theft device according to the invention.

To open anti-theft boxes secured by known anti-theft devices of the above-mentioned type, there are often provided magnetically operated releasing devices or the like, which have to be operated by sales staff of the store, for example. In doing so, the anti-theft device normally has to be positioned at the magnetically operated releasing device to transfer the locking mechanism of the anti-theft device from the locked state into the unlocked state, and, at substantially the same time, the housing of the anti-theft device has to be moved manually from the locking position into the releasing position, in which the anti-theft box is transferable from its closed state into its opened state. However, in many cases, this is very tedious as well as time-consuming and, thus, leads to long waiting times, especially in the checkout area.

Furthermore, known anti-theft devices of the above-mentioned type are typically not intended to be used by customers, so that they are generally not suitable for so called self check-out systems, in which a customer performs a check-out process by herself/himself, including the separation of the anti-theft device and the anti-theft box from merchandise to be protected.

The object of the present invention is therefore to provide an anti-theft device that is improved in this regard.

According to a first aspect of the invention, this object is solved by an anti-theft device of the above-mentioned type, wherein the anti-theft device further comprises an ejector, which is displaceable mounted in the housing and configured to take a retracted position, which corresponds to the locking position of the housing, and an extended position, which corresponds to the releasing position of the housing, wherein the ejector is configured to be transferable from the retracted position into the extended position, if the locking mechanism is in the unlocked state, and wherein the ejector is biased towards the extended position.

According to the invention it is possible, to transfer the housing of the anti-theft device from the locking position into the releasing position by the ejector, which is biased towards its extended position. As a result, to open an anti-theft box, which is secured by the anti-theft device according to the invention, it is sufficient for a user to bring the locking mechanism of the anti-theft device from its locked state into its unlocked state, whereas the housing of the anti-theft device is moved by the effect of the biasing force of the ejector. In this context it should be noted that the ejector may be comprise an ejector operating surface, which is configured to interact with an anti-theft box operating surface formed on the anti-theft box, to move the anti-theft device from the locking position into the releasing position with respect to the anti-theft box, via the biasing force of the ejector. Thus, the time that is required to open the anti-theft box, which is secured by the anti-theft device according to the invention, can be significantly reduced. Furthermore, the anti-theft device may also be operated by untrained customers, so that the anti-theft device is particularly suitable for above-mentioned self check-out systems.

To transfer the ejector from its retracted position in its extended position, it is proposed that the anti-theft device further comprises an ejector biasing element, in particular an ejector biasing spring, which is supported at one end by the housing and at the other end by the ejector.

To allow a user of the anti-theft device according to the invention, to transfer the locking mechanism of the anti-theft device from the unlocked state into the locked state in a simple and easy manner, according to embodiment of the invention, the locking mechanism may comprise a locking button, which is configured to be operated by a user and to selectively take an operated position, which corresponds to the locked state of the locking mechanism, and a non-operated position, which corresponds to the unlocked state of the locking mechanism.

If the anti-theft device comprises the last-mentioned locking button, it is further preferred that the locking button has an operating portion, which is configured to be operated by the user, and a functional portion facing away from the operating portion and configured to directly or indirectly engage with the ejector, such that the ejector is locked in its retracted position, if the locking button is in its operated position. It should be noted that, in this context, “indirectly engage” means that the ejector can not only engage with the functional portion of the locking button itself, but also with a part connected to the functional portion of the locking button, such as a locking element, in particular a locking pin or the like. As a result, after the housing of the anti-theft device is transferred into the locking position on the anti-theft box, the ejector may be blocked in its retracted position by the engagement with the functional portion of the locking button or a part connected therewith.

In principle the locking mechanism may be transferred from the locked state into the unlocked state by any suitable device ensuring sufficient protection against unauthorized opening of the anti-theft device and, thus, of the secured anti-theft box. However, according to a preferred embodiment of the invention, the locking mechanism further comprises a release element, which is made at least in part of a shape-memory alloy and is configured to cause the locking mechanism to be transferred from the locked state to the unlocked state when the shape-memory alloy of the release element is in an excited state. Shape-memory alloys are characterized by the fact that they can transmit very large forces in relation to their material volume while having a long service life over a large number of cycles. Accordingly, the release element can have a particularly compact design and preferably be accommodated entirely in the housing of the anti-theft device. In principle, both thermally and magnetically activatable shape-memory alloys can be used in accordance with the invention. In addition, since energy only hast to be supplied to excite the shape-memory alloy, the anti-theft device can be unlocked by a large number of unlocking devices, preferably contactless. Moreover, one and the same unlocking device can preferably be used to unlock different embodiments of the anti-theft device according to the invention.

If the anti-theft device according to the invention comprises the above-mentioned locking button and the last-mentioned release element, it is further preferred that the locking mechanism comprises a slide, which is designed to be translatable mounted in the housing, wherein the slide is configured to be operatively connected to the release element as well as to the operating button, wherein the locking mechanism is configured such that the operating button transitions from its operated position to its non-operated position, if the shape-memory alloy of the release element is in its excited state.

In the context of the last-mentioned embodiment, to be able to return the slide to its original position, after the release element has been transferred into its exited state, it is further preferred that the slide comprises a slide biasing element, in particular a slide biasing spring, which is supported at one end by the housing and at the other end by the slide.

It should also be noted that the anti-theft device may further comprise a signal-receiving unit, the anti-theft device being configured to cause the locking mechanism to be transferred to the unlocked state when the signal-receiving unit receives a release-initiation signal, and/or a signal-transmitting unit, which is preferably configured to transmit a product information signal to a mobile terminal, such as a smartphone or a cash register system, in response to a product-information request operation. The release-initiation signal may be intended for opening a single predetermined anti-theft device and/or for opening a plurality of predetermined anti-theft devices. The release-initiation signal is preferably an encrypted signal, which can in particular protect against unwanted tampering attempts and/or counteract unauthorized opening of the anti-theft device. The product information signal can include product-related and/or other information such as a price, in particular a customer-specific price, and/or an article/manufacturer name and/or availability information and/or similar other information relating to the merchandise protected by the anti-theft device.

If the anti-theft device according to the invention comprises functions that require a supply of electric energy, such as the above-proposed release element, the anti-theft device may further comprise an energy storage, such as a battery or the like. In this context, to achieve long energy storage or battery life cycles and to reduce the amount of maintenance work, according to a further embodiment, it is proposed that the ejector is associated with a switching element, wherein the switching element is configured to be in an operated state, if the ejector is in its retracted position, and in an non-operated state, if the ejector is in its extended position, wherein the anti-theft device is configured to disable an energy supply of the anti-theft device, if the switching element is in the non-operated state. Here, it is also possible, that the anti-theft device is configured to disable an energy supply of the anti-theft device only, if the switching element is in the non-operated state for at least a predetermined time period, such as several seconds or minutes. If the energy supply of the anti-theft device is disabled, the anti-theft device may be further configured to enable the energy supply of the anti-theft device, once the switching element is transferred into the operated state.

In addition, to be able to ensure that the anti-theft device is only removed by authorized persons or only once the protected merchandise has already been paid for, in a development of the invention it is proposed that the anti-theft device further comprises an alarm generation apparatus configured to emit an acoustic and/or optical alarm signal in response to an attempt to remove the anti-theft device from the merchandise to be protected without authorization.

Furthermore, the anti-theft device may configured to be detachable mounted on anti-theft boxes of different size and/or shape. Accordingly, it is possible to use one and the same anti-theft device for different types of anti-theft boxes, so that if the shape or size of merchandise to be protected changes or varies, it is sufficient to replace the anti-theft box, while the anti-theft device can continue to be used.

During presentation of merchandise in sales areas or the like, in some cases, merchandise is hung on a wall or on retail shelves or the like. However, in this case, it is often difficult to ensure that a hanging arrangement, which is typically formed on the anti-theft box, does not interfere with the anti-theft device, which is often mounted to the anti-theft box at a position near the hanging arrangement.

To address this circumstance, according to a second aspect of the invention, which may be combined with the first aspect of the invention, it is provided an anti-theft device of the above-mentioned type, wherein the anti-theft device further comprises a hanging arrangement, which is mounted to the housing of the anti-theft device.

Accordingly, since the hanging arrangement is no longer formed on the anti-theft box, but on the housing of the anti-theft device, the hanging arrangement does not interfere with the assembly of the anti-theft device on the anti-theft box or the movement of the anti-theft device relative to the anti-theft box. With respect to further advantages and effects of the anti-theft device according to the second aspect of the present invention, reference is made to the above explanations with respect to the anti-theft device according to the first aspect.

In a development of the anti-theft device of the second aspect, the hanging arrangement may be configured as an Euro-hole hanging arrangement. The Euro-hole hanging arrangement may comprise a shape having a recess corresponding to DIN EN 13010, for example.

In addition or as an alternative, the hanging arrangement may be configured to be detachable from or retractable into the housing of the anti-theft device. As a result, it is possible to employ one and the same anti-theft device not only in a case, in which merchandise is hung on the wall or on retail shelves for presentation, but also in a case, in which the hanging arrangement is not required.

According to a third aspect of the present invention it is provided a system, comprising the anti-theft device according to any of the first and the second aspect, and an anti-theft box, which is configured to receive merchandise to be protected.

With respect to the advantages and effects of the system according to the third aspect of the present invention, reference is made to the above explanations with respect to the anti-theft device according to the first and the second aspect.

Furthermore, it should be added that the anti-theft box may comprises a guiding protrusion arrangement, which is configured to be engageable with a corresponding guiding recess arrangement, which is formed on the housing of the anti-theft device.

Figure 2A:
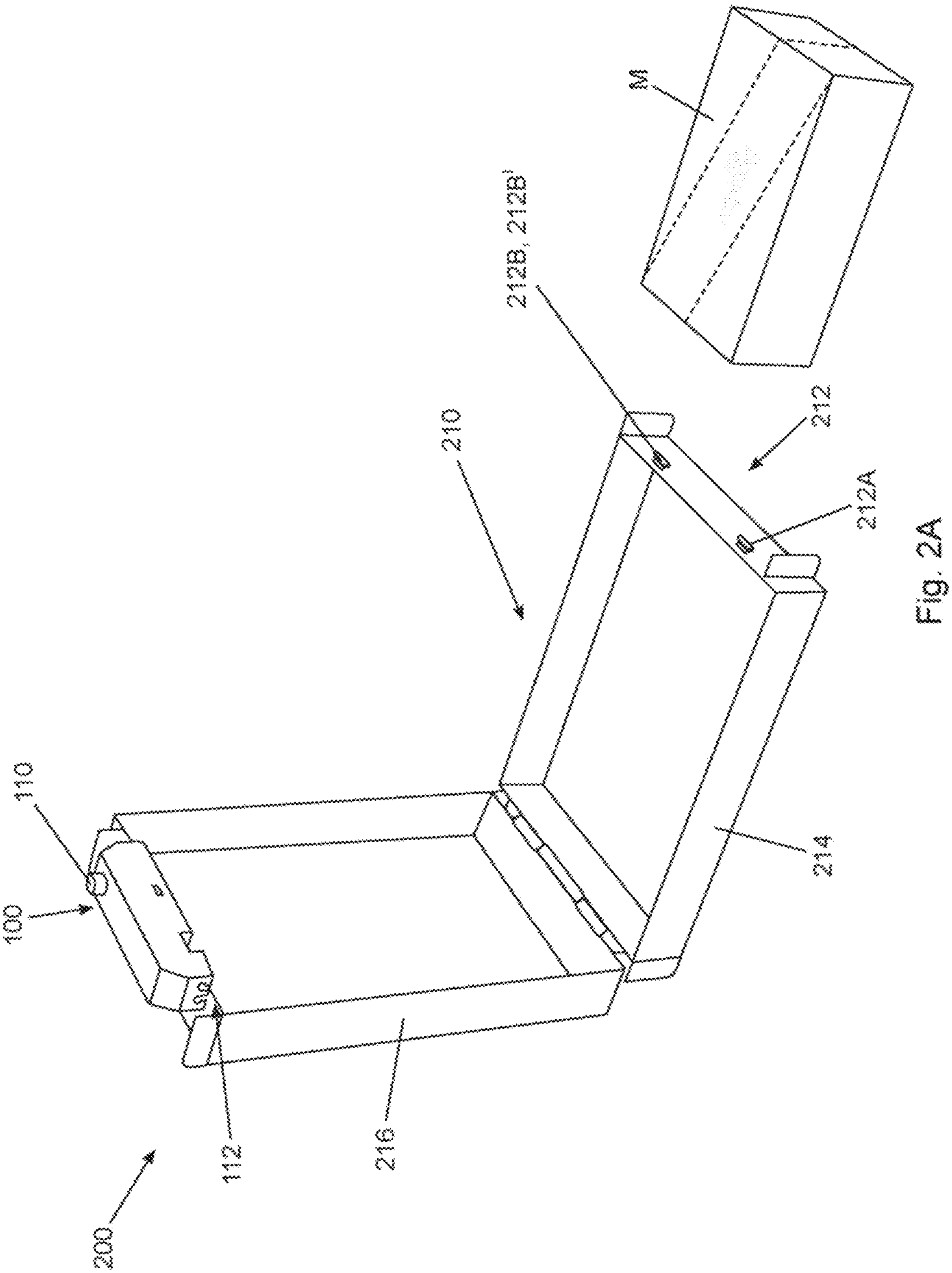
Figure 2B:
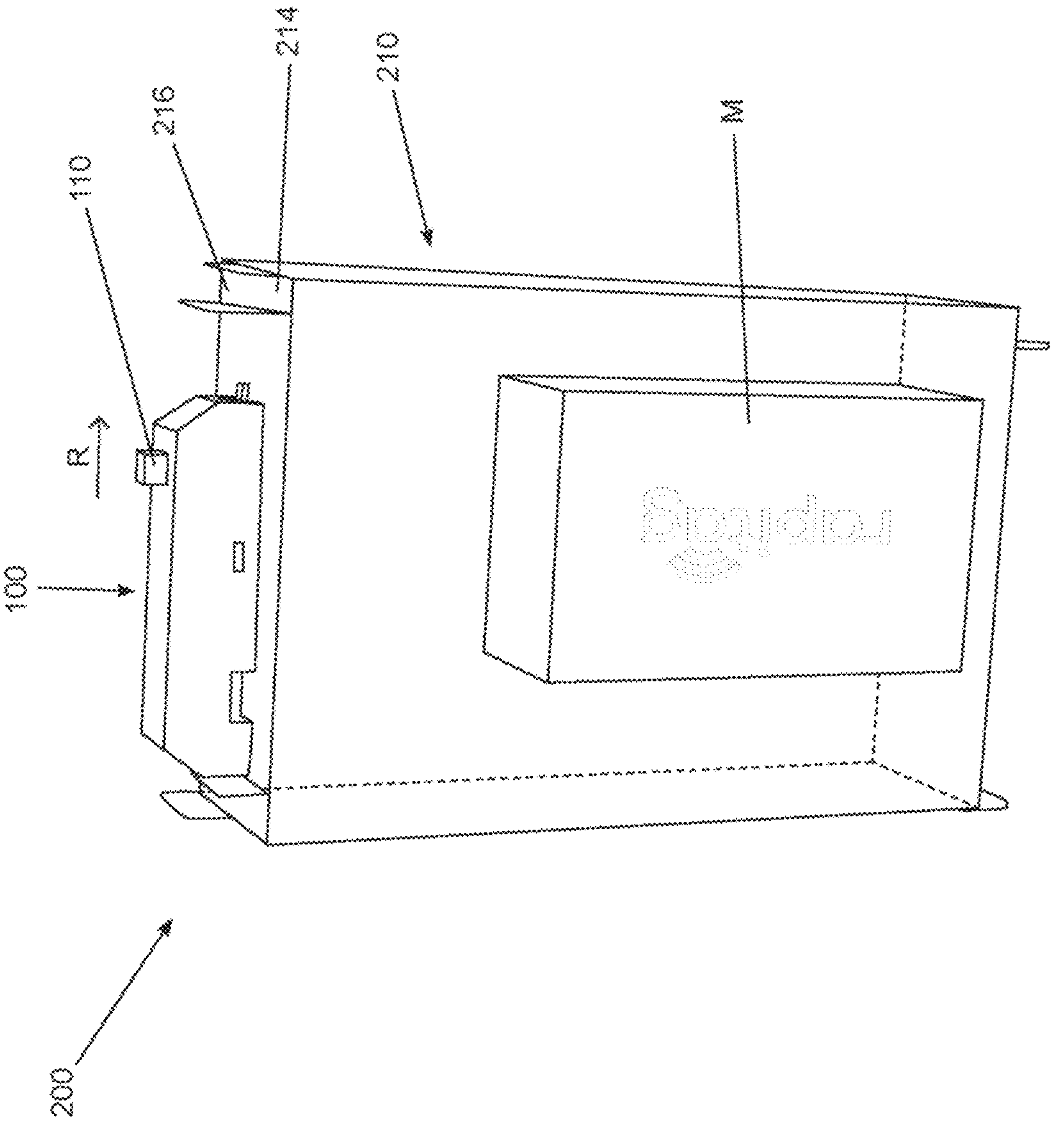
Figure 2C:
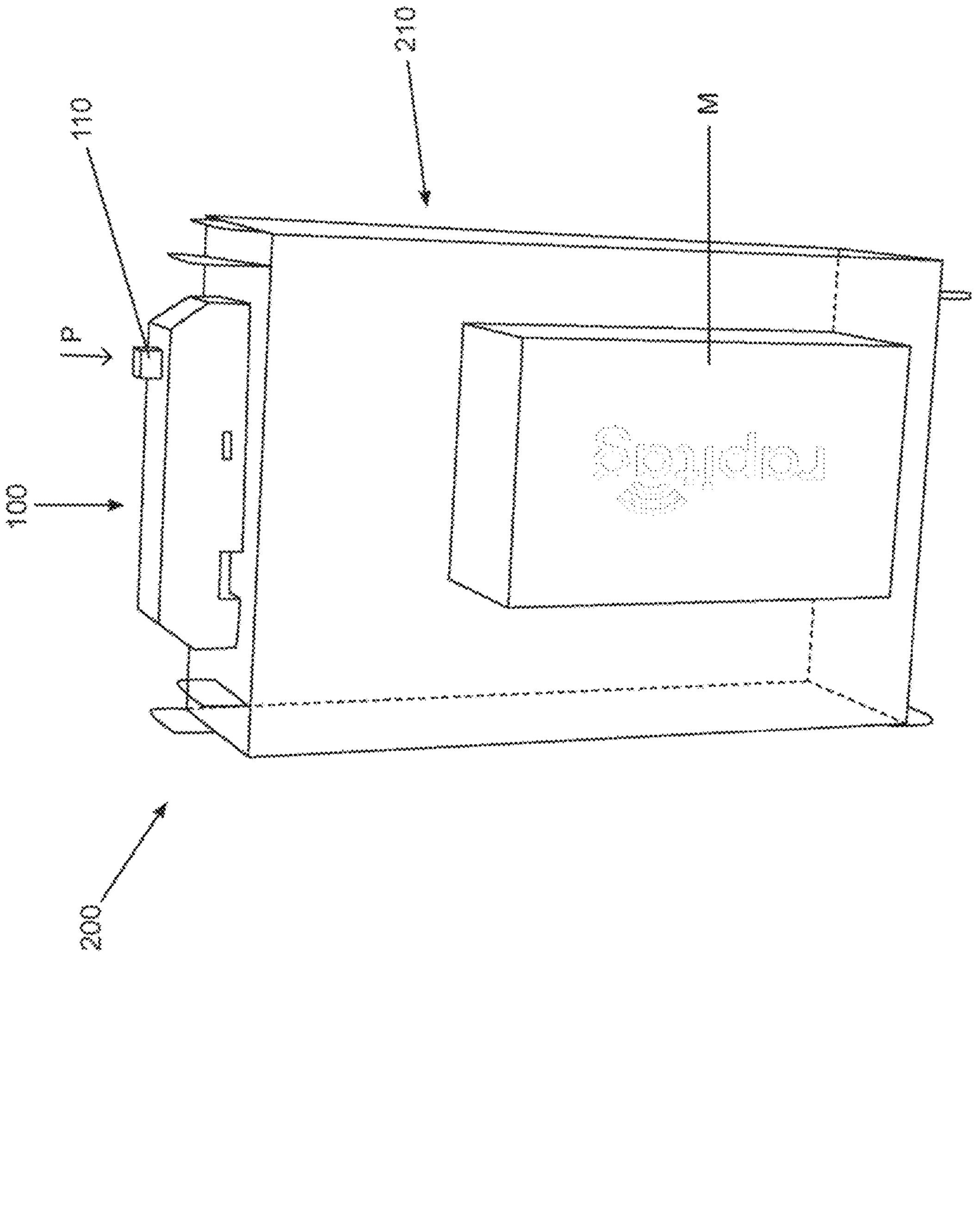
Figure 2D:
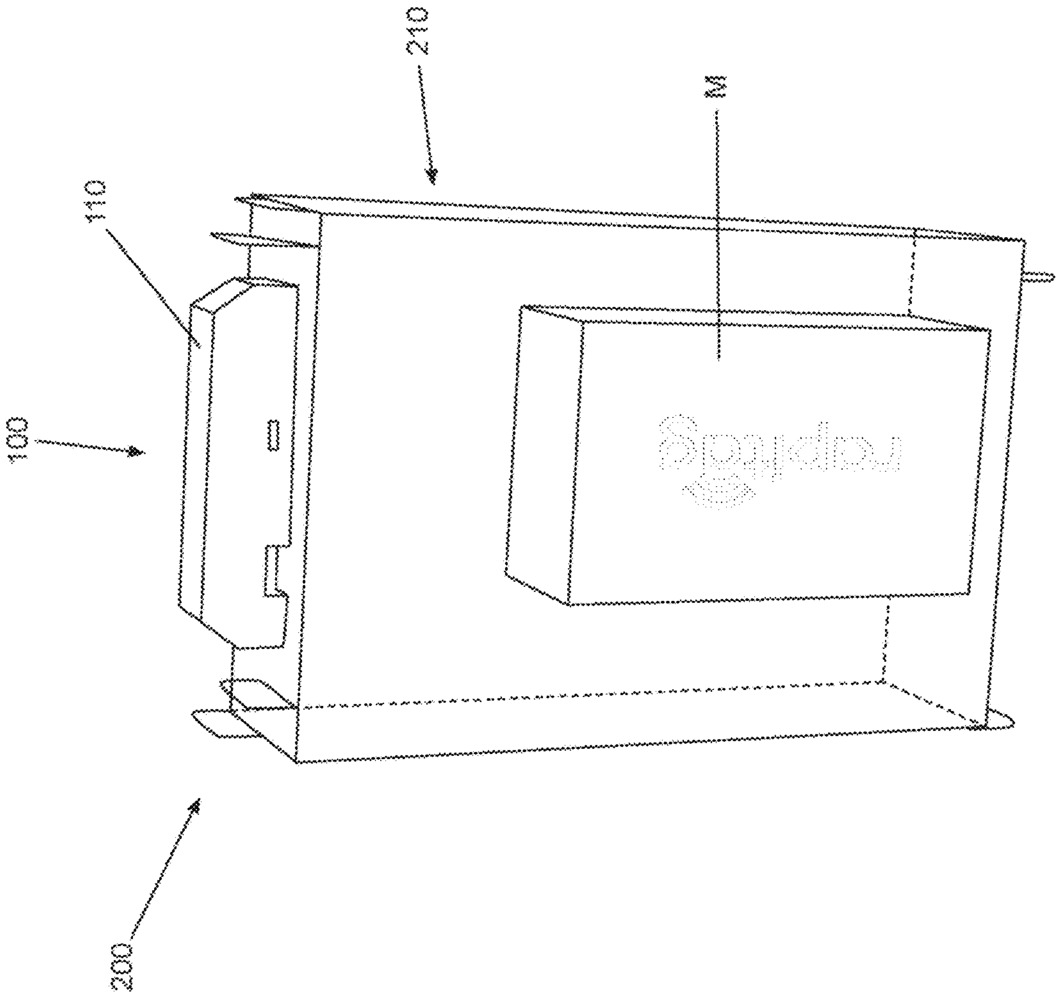
Figure 3A:
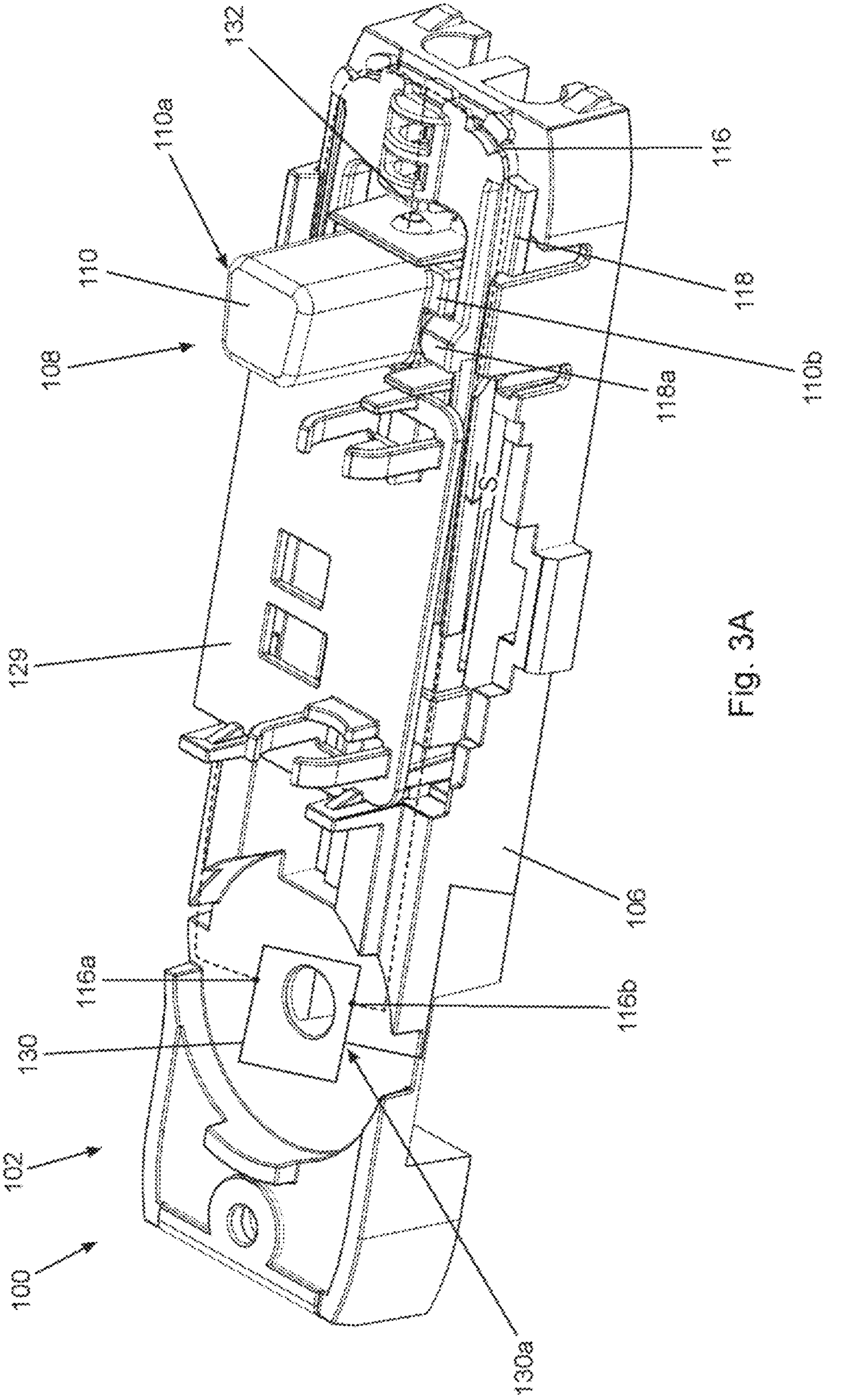
Figure 3B:
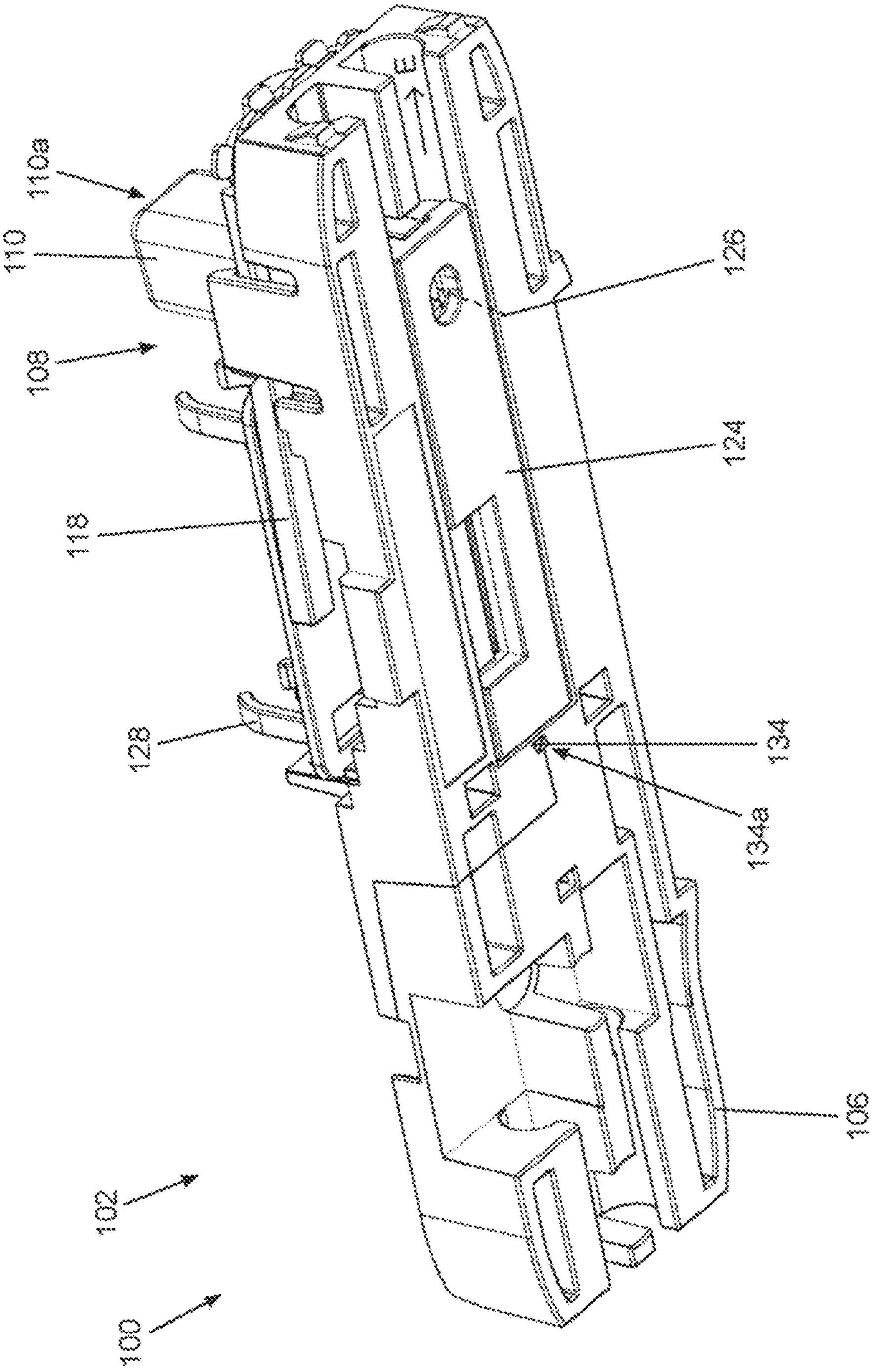
Figure 3C:
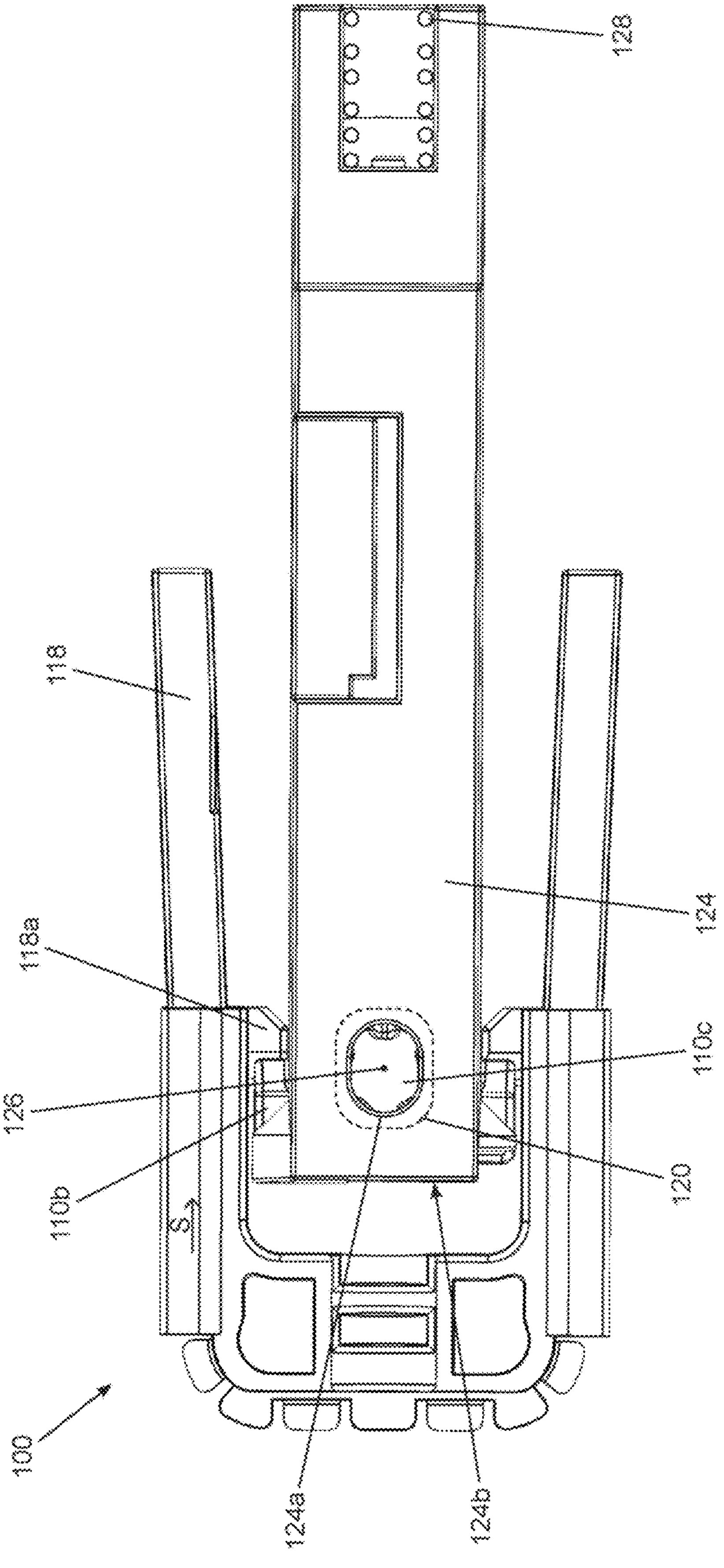
Figure 4:
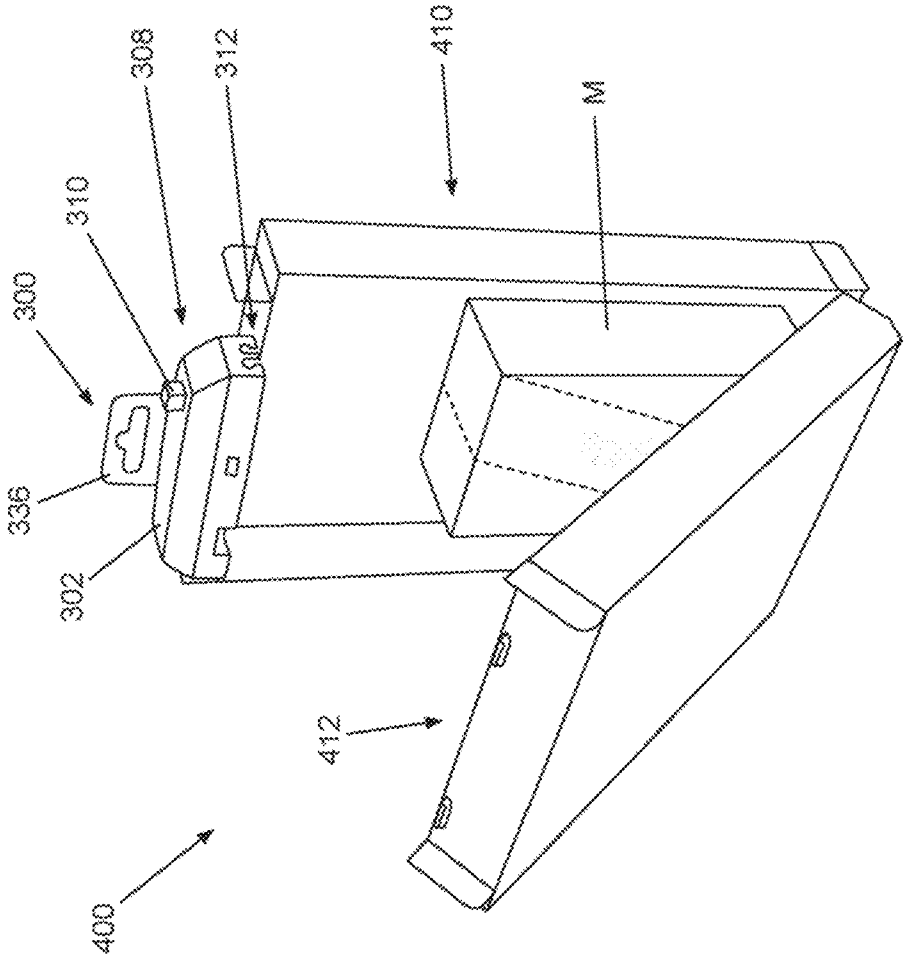

The invention will be described below in more detail on the basis of the accompanying drawings, in which:

FIG. 1 is a perspective view of an embodiment of an anti-theft device according to the first aspect of the invention, FIG. 2A is a perspective view of a system according to the invention including the anti-theft device of FIG. 1 as well as an anti-theft box for merchandise to be protected, with the anti-theft box being in an opened state, FIG. 2B is a perspective view of the system of FIG. 2A, with the anti-theft box being in an closed state and the anti-theft device being in an releasing position, FIG. 2C is a perspective view of the system of FIG. 2A, with the anti-theft box being in the closed state, the anti-theft device being in a locking position, and a locking mechanism of the anti-theft device being in an unlocked state, FIG. 2D is a perspective view of the system of FIG. 2A, with the anti-theft box being in the closed state, the anti-theft device being in a locking position, and the locking mechanism of the anti-theft device being in a locked state, FIG. 3A is a perspective view of the anti-theft device of FIG. 1, with a cover of a housing of the anti-theft device being removed, FIG. 3B is a perspective view of the anti-theft device corresponding to FIG. 3A, but viewed from below, FIG. 3C is a bottom view of the anti-theft device corresponding to FIG. 3A, but with further parts being removed, and FIG. 4 is a perspective view of an embodiment of an anti-theft device according to the second aspect of the invention.

In FIG. 1 an anti-theft device according to an embodiment of the present invention is generally indicated by reference sign 100. The anti-theft device 100 comprises a housing 102, which in turn comprises a housing cover 104 and a housing base part 106. Furthermore, the anti-theft device 100 further comprises a locking mechanism 108, of which in FIG. 1 merely a locking button 110 is shown, which will be described later. In order to be able to displaceable mount the anti-theft device 100 to an anti-theft box 210 (which will be also described later with reference to FIGS. 2A to 2D), the housing 102 comprises a recess arrangement 112 including recesses 112A and 112B, which are formed on opposite sides of the housing 102 and are engageable with a corresponding guiding protrusion arrangement 212 of the anti-theft box 210, including guiding protrusions 212A and 212B.

FIG. 2A is a perspective view of a system 200 of an embodiment according to the invention, including the anti-theft device 100 of FIG. 1 as well as the anti-theft box 210 for merchandise M to be protected, with the anti-theft box 210 being in an opened state. As shown in FIG. 2A, the anti-theft box 210 of the present embodiment comprises two box housing parts 214 and 216, which are pivotable relative to each other. If the anti-theft box 210 is in the opened state like in FIG. 2A, merchandise M may be inserted or removed from the anti-theft box 210. Merchandise M may be CDs, DVDs, video games, digital cameras, software, cosmetics, razors, food and the like, for example. The anti-theft box 210 of the present embodiment is formed in shape corresponding to a rectangular cuboid, however, this is not limiting. The anti-theft device 100 may be combined with an anti-theft box of any type, as far as it is constructed such that the anti-theft device 100 may be displaceable mounted to the anti-theft box in the above-described manner. Here, the anti-theft box 210 is made from transparent polycarbonate material, however this is likewise not limiting. The anti-theft box may be made also from different materials, which not necessarily have to be transparent.

FIG. 2B shows the system 200 of FIG. 2A, with the anti-theft box 210 being in an closed state and the anti-theft device 100 being in an releasing position. In the releasing position of the anti-theft device 100 the anti-theft box 210 is transferable from the closed state into the opened state and vice versa, that is the two box housing parts 214 and 216 may be pivoted relative to each other. To ensure that the guiding protrusion 212A does not interfere with the housing 102 of the anti-theft device 100, the housing 102 further comprises a housing opening 114, which is configured to receive the guiding protrusion 212A, if the anti-theft device 100 is in the releasing position shown in FIG. 2B. The further guiding protrusion 212B may be formed and positioned such that it does not interfere with the housing 102, if the housing 102 of the anti-theft device 100 is in the releasing position shown in FIG. 2B.

To transfer the anti-theft device 100 from the releasing position into a locking position, the anti-theft device 100 can be moved along a direction R, for example by a manual force of a user, until it reaches the locking position, which is shown in FIG. 2C, for example. If anti-theft device 100 is in the locking position relative to the anti-theft box 210, the anti-theft box 210 is no longer transferable from the closed state into the opened state, as the guiding protrusion arrangement 212A of the anti-theft box 210 and the recess arrangement 112 of the anti-theft device 100 are engaged in a manner such that pivoting movement of the two box housing parts 214 and 216 is prevented.

If the anti-theft device 100 is in the state shown in FIG. 2C, the locking mechanism 108 is in an unlocked state. If the locking mechanism 108 is in the unlocked state, as shown in FIGS. 2A to 2C, movement of the anti-theft device 100 along the direction R and opposite thereto is allowed. Therefore, to ensure that the anti-theft device 100 remains in the position shown in FIG. 2C, an operating portion 110*a* of the locking button 110 may be operated by a user to transfer the locking button 110 from its non-operated position (shown in FIG. 2C) into an operated position (shown in FIG. 2D) along direction P, in which the locking button 110 is, preferably entirely, retracted in the housing 102 of the anti-theft device 100. If the locking button 110 is in its operated position shown in FIG. 2D, the locking mechanism 108 of the anti-theft device 100 is in its locked state. In this context it should be noted that, according to this embodiment, the locking button 110 has to be pressed after the anti-theft device 100 has been transferred in its looking state, that is, it has been moved along the direction R. This ensures that a locking element 126 (which will be described with reference to FIGS. 3B and 3C) may engage with a corresponding ejector recess 124*a* of an ejector 124 (to be described later) and a box locking recess (not shown) or the like, which is formed on the anti-theft box 210, to prevent movement of the anti-theft device 100 along the direction R from the looking position into the releasing position. Thus, in FIG. 2D the anti-theft device 100 is in an securing state, in which merchandise M within the anti-theft box 210 is protected against unauthorized removal.

The procedure how the locking mechanism 108 is again transferred from its locked state into its unlocked state, and, thus the anti-theft device 100 is transferred from its locking position into its releasing position, will now be described with reference to FIGS. 3A and 3B, which show perspective views of the anti-theft device 100 of FIG. 1, with the housing cover 104 of the housing 102 of the anti-theft device 100 being removed. It should be noted that in FIGS. 3A and 3B, as in FIG. 1, the locking button 110 is in its operated position. Furthermore, reference is made to FIG. 3C, which is a bottom view of the anti-theft device 100 corresponding to FIG. 3A, with the housing base part 106 and a further housing cover part 129 of the housing 102 being removed.

To transfer the locking mechanism 108 from its locked state into its unlocked state, the locking mechanism 108 of this embodiment further comprises a release element in the form of a shape memory alloy wire 116, which is wrapped around a slide 118 and, at both ends 116*a* and 116*b*, connected to a chip unit 130 mounted in the housing base part 106. For the sake of simplicity the shape memory alloy wire 116 is only indicated by a dotted line in FIG. 3A. The slide 118 is slidable mounted in the housing base part 106 of the housing 102. If the shape memory alloy wire 116 is transferred to its excited state, for example by supplying energy from the chip unit 130, which in turn may be connected to a battery or a similar energy supply device (not shown), the shape memory alloy wire 116 contracts in such a way that the slide 118 is moved according to a direction, which substantially corresponds to direction S indicated by an arrow in FIG. 3A. As a result, a slide projection 118*a* is being disengaged from a locking button projection 110*b*, so that the locking button 110 can be transferred again in its unoperated position, by a force induced by a spring 120 (indicated by dotted line in FIG. 3C), which is arranged between a functional portion 110*c* of the locking button 110 and the ejector 124.

If the locking button 110 is again in its unoperated state, which corresponds to the unlocked state of the locking mechanism 108, the locking element 126 is disengaged with the box locking recess (not shown) and the ejector recess 124*a*. As a result, the anti-theft device 100 is again movable along a direction opposite to direction R from its looking position (shown in FIG. 2C) into its releasing position (shown in FIG. 2B).

To automate this movement, the ejector 124 according to this embodiment comprises an ejector spring 128 (shown in FIG. 3C), which is supported on one end on the ejector 124 and on the other end on the housing base part 106. Thus, once the movement of the ejector 124 has been released, that is, once the locking button 110 along with the locking element 126 has been transferred to the non-operated position, the ejector 124 will move in a manner such that the housing 102 of the anti-theft device 100 will be transferred from the looking position into the releasing position. For this purpose, the ejector 124 may comprise an ejector operating surface 124*b*, which is configured to interact with an anti-theft box operating surface 212B' formed on at least one of the guiding protrusions of the guiding protrusion arrangement 212 of the anti-theft box 210.

To ensure that the slide 118, after a translation along the direction S induced by the shape memory alloy wire 116, can be transferred back to its unoperated position, the locking mechanism 108 may further comprise a slide spring 132 (as shown in FIG. 3A by a further dotted line), which on one end is supported by the slide 118 and on its other end by the housing base part 106 of the housing 102.

According to this embodiment the ejector 124 is further associated with a switching element 134 mounted to the housing base element 106, wherein the switching element 134 is configured to be in an operated state, if the ejector 124 is in its retracted position (shown in FIG. 3B), and in an non-operated state, if the ejector 124 is in its extended position, in which it is moved away from the switching element 134 along a direction E. Thus, the anti-theft device 100 may be configured to disable an energy supply of the anti-theft device 100, if the switching element 134 is in the non-operated state. Therefore, the switching element 134 may comprise a signal output 134*a*, which is connected to a signal input 130*a* of the chip unit 130.

Finally, it should be mentioned that the anti-theft device 100 may further comprise an alarm generation apparatus configured to emit an acoustic and/or optical alarm signal in response to an attempt to remove the anti-theft device 100 from the merchandise to be protected without authorization. The alarm generation apparatus may be integrated in the chip unit 130.

Also integrated with said chip unit 130, the anti-theft device 100 may further comprise a signal-receiving unit that is configured to receive a release initiation signal, via Bluetooth or the like, for example, to excite the shape memory alloy wire 116 and, thus, to unlock the locking mechanism 108, and a signal-transmitting unit, which is preferably configured to transmit a product information signal to a mobile terminal in response to a product information request operation.

It should be added that the anti-theft device 100 can further comprise an electronic article surveillance element (EAS element) (not shown in the Figures) which is configured to interact with an electronic article surveillance system (not shown either) such that when a customer attempts to remove protected merchandise to which the anti-theft device 100 is attached from a store, for example, without authorization, the alarm signal is output as soon as the merchandise passes a detector unit associated with the electronic article surveillance system.

FIG. 4 is a perspective view of a further system 400, including an embodiment of an anti-theft device 300 according to the second aspect of the invention, and a anti-theft box 410 corresponding to that, which has been described with reference to the embodiment of the anti-theft device 100 according to the first aspect. The anti-theft device 300 substantially corresponds to the embodiment of the anti-theft device 100 described with reference to the first aspect of the invention. Therefore, in FIG. 4 analogous parts are provided with the same reference signs as in FIGS. 2A to 2D, but increased by 200. However, the anti-theft device 300 additionally includes a hanging arrangement 336, which is mounted to the housing 302 of the anti-theft device 300. In this embodiment the hanging arrangement 336 is configured as an Euro-hole hanging arrangement. Furthermore, the hanging arrangement may be configured to be detachable from or retractable into the housing 302 of the anti-theft device 300.

The invention claimed is:

1. An anti-theft device, comprising:

a housing, which is configured to be displaceable mounted to an anti-theft box, which anti-theft box is configured to receive merchandise to be protected, the housing being further configured to selectively take a releasing position, in which the anti-theft box is transferable from a closed state into an opened state, and a locking position, in which the anti-theft box is not transferable from the closed state into the opened state;

a locking mechanism associated with the housing and having an unlocked state, in which the housing is displaceable from the locking position into the releasing position, and a locked state, in which the housing is not displaceable from the locking position into the releasing position; and an ejector, which is displaceable mounted in the housing and configured to take a retracted position, which corresponds to the locking position of the housing, and an extended position, which corresponds to the releasing position of the housing, wherein the ejector is configured to be transferable from the retracted position into the extended position, if the locking mechanism is in the unlocked state, and wherein the ejector is biased towards the extended position, wherein the locking mechanism further comprises a release element, which is made at least in part of a shape-memory alloy and is configured to cause the locking mechanism to be transferred from the locked state to the unlocked state when the shape-memory alloy of the release element is in an excited state, and a slide, which is designed to be translatable mounted in the housing, wherein the slide is configured to be operatively connected to the release element as well as to a locking button of the locking mechanism, wherein the locking mechanism is configured such that the locking button transitions from its operated position to its non-operated position if the shape-memory alloy of the release element is in its excited state.

2. The anti-theft device according to claim 1, wherein the anti-theft device further comprises an ejector biasing element which is supported at one end by the housing and at the other end by the ejector.

3. The anti-theft device according to claim 1, wherein the locking button of the locking mechanism is configured to be operated by a user and to selectively take an operated position, which corresponds to the locked state of the locking mechanism, and a non-operated position, which corresponds to the unlocked state of the locking mechanism.

4. The anti-theft device according claim 3, wherein the locking button has an operating portion, which is configured to be operated by the user, and a functional portion facing away from the operating portion and configured to directly or indirectly engage with the ejector, such that the ejector is locked in its retracted position, if the locking button is in its operated position.

5. The anti-theft device according to claim 1, wherein the slide comprises a slide biasing element, which is supported at one end by the housing and at the other end by the slide.

6. The anti-theft device according to claim 1, further comprising a signal-receiving unit, the anti-theft device being configured to cause the locking mechanism to be transferred to the unlocked state when the signal-receiving unit receives a release-initiation signal.

7. The anti-theft device according to claim 1, further comprising a signal-transmitting unit configured to transmit a product information signal to a mobile terminal in response to a product-information request operation.

8. The anti-theft device according to claim 1, wherein the ejector is associated with a switching element, wherein the switching element is configured to be in an operated state, if the ejector is in its retracted position, and in an non-operated state, if the ejector is in its extended position, wherein the anti-theft device is configured to disable an energy supply of the anti-theft device, if the switching element is in the non-operated state.

9. The anti-theft device according to claim 1, further comprising an alarm generation apparatus configured to emit an acoustic and/or optical alarm signal in response to an attempt to remove the anti-theft device from the merchandise to be protected without authorization.

10. The anti-theft device according to claim 1, wherein the anti-theft device is configured to be detachable mounted on anti-theft boxes of different sizes and/or shapes.

11. The anti-theft device according to claim 1, further comprising:

a hanging arrangement, which is mounted to the housing of the anti-theft device.

12. The anti-theft device according to claim 11, wherein the hanging arrangement is configured as an Euro-hole hanging arrangement, and/or the hanging arrangement is configured to be detachable from or retractable into the housing of the anti-theft device.

13. The anti-theft device according to claim 11, further comprising an anti-theft box, which is configured to receive merchandise to be protected.

14. The anti-theft device according to of claim 13, wherein the anti-theft box comprises a guiding protrusion arrangement, which is configured to be engageable with a corresponding guiding recess arrangement, which is formed on the housing of the anti-theft device.

* * * * *